United States Patent [19]

Takaki

[11] Patent Number: 4,683,549
[45] Date of Patent: Jul. 28, 1987

[54] SEQUENCE CONTROL METHOD AND APPARATUS

[75] Inventor: Masaoki Takaki, Hitachi, Japan

[73] Assignees: Hitachi, Ltd., Tokyo; Hitachi Control Systems, Inc., Ibaraki, both of Japan

[21] Appl. No.: 607,652

[22] Filed: May 7, 1984

[30] Foreign Application Priority Data

May 7, 1983 [JP] Japan .................................. 58-79895

[51] Int. Cl.⁴ .......................... G06F 9/00; G06F 15/00
[52] U.S. Cl. .................................... 364/900; 364/300; 364/191
[58] Field of Search ... 364/200 MS File, 300 MS File, 364/900 MS File, 130, 131, 133, 147, 191; 235/304; 371/19

[56] References Cited

U.S. PATENT DOCUMENTS

| | | | |
|---|---|---|---|
| 3,875,564 | 4/1975 | Thuruoka et al. | 364/900 |
| 3,964,026 | 6/1976 | Yamauchi et al. | 364/900 |
| 4,058,850 | 11/1977 | Sikander Sheikh | 364/900 |
| 4,115,853 | 9/1928 | Dummermuth | 364/900 |
| 4,129,901 | 12/1978 | Masuda | 364/104 |
| 4,183,462 | 1/1980 | Hideshima et al. | 235/304 |
| 4,298,958 | 11/1981 | Takaki et al. | 364/900 |
| 4,316,260 | 2/1982 | Hideshima et al. | 364/900 |
| 4,328,539 | 5/1982 | Heeger | 364/900 |
| 4,410,959 | 10/1983 | Tajima et al. | 364/900 |
| 4,441,161 | 4/1984 | Sasaki et al. | 364/900 |
| 4,443,863 | 4/1984 | Busch et al. | 364/900 |

OTHER PUBLICATIONS

"IGA/1971 Sixth Annual Meeting of the IEEE Industry and General Applications Group", IEEE Conference Record, Cleveland Sec.

*Primary Examiner*—Archie E. Williams, Jr.
*Assistant Examiner*—William G. Niessen
*Attorney, Agent, or Firm*—Antonelli, Terry & Wands

[57] ABSTRACT

A sequence program for a system to be sequence-controlled is divided into a plurality of divisional programs, which are stored in a program memory of a sequence processor. A main program including a plurality of instruction blocks is read out from the system under control and the execution or non-execution status of the divisional program for the corresponding instruction block is determined and stored in the program memory of the sequence processor. An address table indicating correspondence between the divisional programs and their top addresses is stored in a data memory of a sequence control processor. The sequence processor cyclically executes the main program, and when it determines the need for execution of the divisional program in a certain instruction block, it issues an interrupt signal including identification information for identifying the corresponding divisional program to the control processor. The control processor responds by interrupting the execution of the main program by the sequence processor, looks up the address table to obtain the top address of the corresponding divisional program and causes the sequence processor to execute it, and after the execution thereof, resumes the execution of the main program. By excluding the step execution programs from the main program, the main program sequence cycle time can be shortened. Since no jump destination address information is included in the main program, insertion and deletion of the instruction block to and from the main program are facilitated.

14 Claims, 19 Drawing Figures

SEQUENCE CONTROL METHOD AND APPARATUS

FIELD OF THE INVENTION

The present invention relates to sequence control method and apparatus, and more particularly to an operation processing system of a programmable controller (PC) which uses a semiconductor digital logic circuit.

BRIEF DESCRIPTION OF THE DRAWINGS

The feature of the present invention will be apparent from the description and the accompanying drawings, in which.

DESCRIPTION OF THE PRIOR ART

Figure 1:
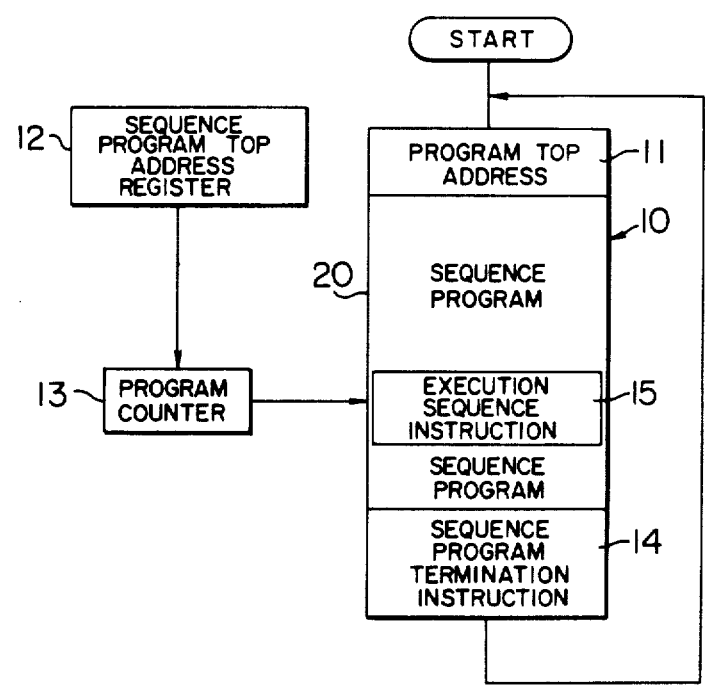
FIG. 1 shows a conventional sequence control system.

As shown in FIG. 1, in a programmable controller (PC) which uses a semiconductor digital logic circuit, a sequence control processor sequentially executes a sequence program 10 stored in a sequence program memory 20 of the PC starting from a top address of the sequence program until a sequence program termination instruction 14 is issued. The address of the memory 20 is sequentially updated, that is, the content of a program counter 13 is updated and a sequence control instruction 15 stored in the designated address is executed. Since each sequence control instruction comprises one word, the content of the program counter 13 is incremented by one per instruction during the execution of the sequence program. When the sequence program termination 14 is issued, the top address 11 of the sequence program is set to the program counter 13.

In the conventional PC, the sequence program instructions are sequentially executed starting from the top address of the sequence program until the sequence program termination instruction is issued, and then the sequence returns to the top of the sequence program so that the sequence operation is cyclically and endlessly carried out.

In the prior art system, since all the instruction words from the top address to the end instruction are executed, a sequence cycle time equal to (execution time for one sequence instruction)×(the number of instructions in the sequence program) is required.

Figure 2A:
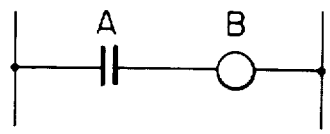
FIGS. 2a and 2b illustrate problems encountered in the sequence control system shown in FIG. 1.
Figure 2B:
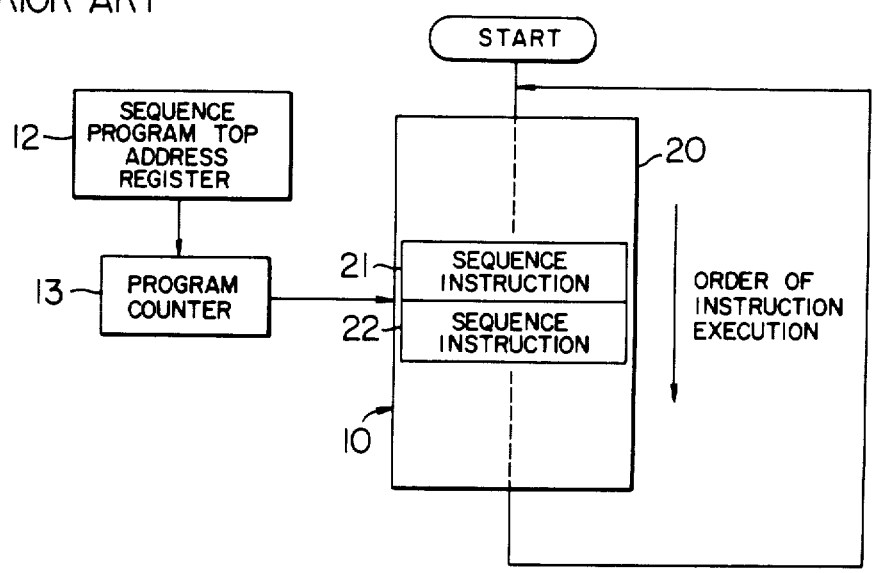

When the sequence instructions are executed in the PC, an actual sequence processing response time varies. This will be explained with reference to FIGS. 2a and 2b. When a sequence ladder chart as shown in FIG. 2a is to be executed in the sequence program 10, an ON/OFF state of a contact A in FIG. 2a is read in by a sequence instruction 21 of FIG. 2b and a sequence relay ladder operation is carried out, and a result is outputted to a relay output coil B of FIG. 2a by the next sequence instruction 22.

Assuming that a signal indicating a change of the state of the contact A from ON to OFF is read in when the content of the instruction execution program counter 13 points to the sequence instruction 21, the relay output coil B is turned OFF by the sequence instruction 22. However, if the relay contact A changes from ON to OFF when the instruction execution program counter 13 points to the sequence instruction 22, the relay output coil B remains ON because the contact A has been set to ON when the sequence instruction 21 was executed. The relay output coil B is turned OFF after the sequence program 10 has been cycled and the OFF state of the relay contact A by the sequence instruction 21 is detected. In this case, a sequence processing response delay time is equal to the sequence operation cycle time.

Figure 3:
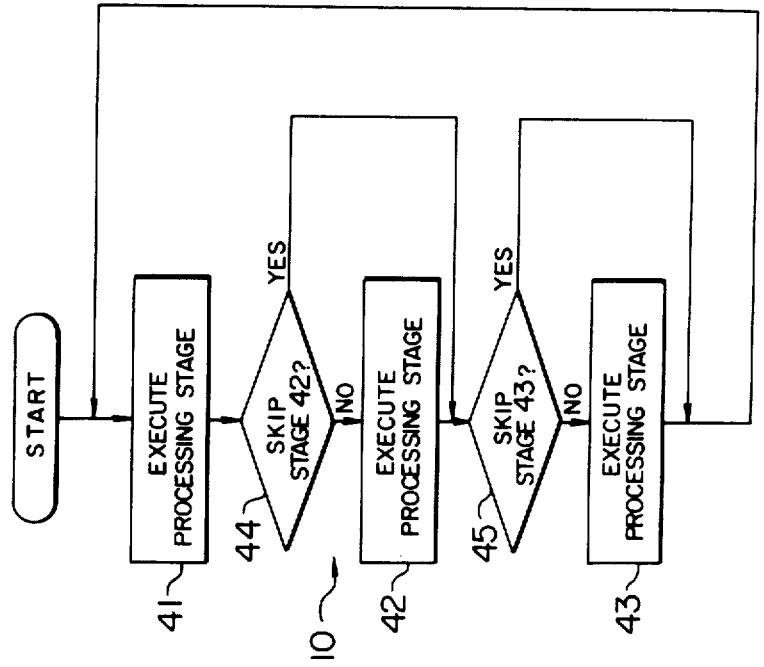
FIG. 3 shows another conventional sequence control system.

Thus, depending on the timing of the sequence instruction for the relay contact A, the sequence response time varies with a maximum delay time being full sequence operation cycle time. This is a phenomenon inherent in the PC which cyclically repeats the execution of the unbranched sequence program. Accordingly, a sequence controller having as short a sequence cycle time as possible is required. To this end, in a prior art sequence controller, a jump instruction as shown in FIG. 3 is used to skip a program which is no longer necessary in the current sequence processing. In the sequence program 10 shown in FIG. 3, a sequence processing stage 41 is always scanned but sequence processing stages 42 and 43 may be skipped in accordance with the status of the system under control by skip decision instruction blocks 44 and 45.

Figure 4:
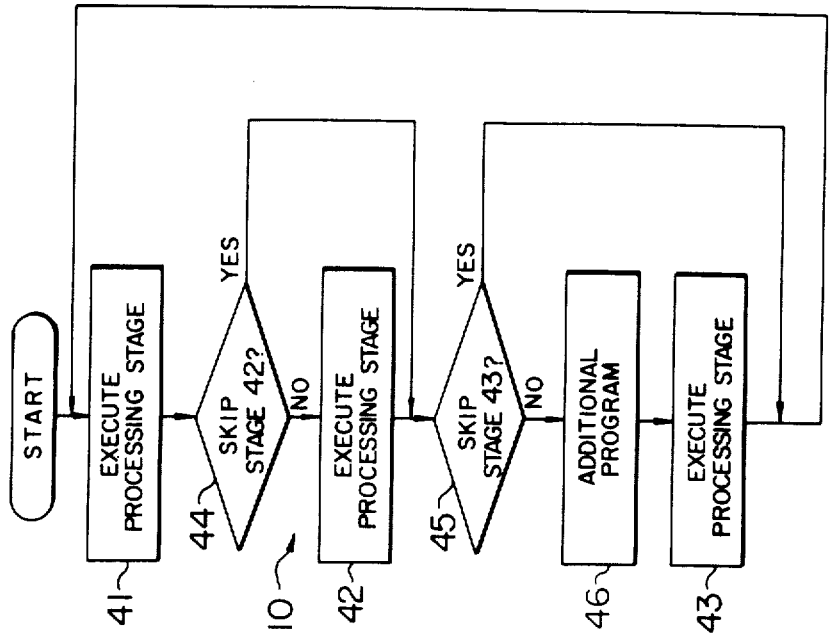
FIG. 4 illustrates problems encountered in the sequence control system shown in FIG. 3.

However, this jump instruction system has the following defect. The sequence program is usually modified frequently. It is not too much to say that 30–40% of the sequence programs prepared in a design center are modified during system adjustments in the field. Since the control logic of the PC is implemented by software, it can be readily changed to a different processing function by merely changing the program. An important factor required for the PC is the easiness of modification. However, the jump instruction must have a jump destination address information. If an additional program 46 is added to the sequence program 10 of FIG. 3 as shown in FIG. 4, the destination address of the skip must be changed in the skip decision instruction block 45. Whether the address is provided as a relative address or as an absolute address, it is very difficult even with a computer software technique to check the contents of all programs, pick up only those jump instructions to be changed and modify the addresses, if the program is partially deleted or added. Thus, when the jump destination address information is included in the sequence program 10, it is difficult to modify the sequence program 10 and the advantage of the PC is not utilized.

On the other hand, many of the PC programs are prepared while the programmers assume that the sequence comprises a plurality of sequence processing stages. The programmer usually visualizes in his mind or draws on a paper sequence time chart and then block flow charts of stages of the sequence. However, in an actual sequence program structure, the process does not exactly proceed stage by stage (hereinafter called stage increment) but a control program for the stages and a stage increment program which describes a transition condition between sequence processing stages are mixed into one program. This is due to the fact that the prior art PC has no concept of substantial sequence processing stages because of the endless loop processing of the single program as shown in FIG. 1.

SUMMARY OF THE INVENTION

It is therefore an object of the present invention to provide a sequence control. method and apparatus which allow a fast processing response in each processing stage.

It is another object of the present invention to provide a sequence control method and apparatus which allow easy modification of a sequence program.

It is still another object of the present invention to provide a sequence control method and apparatus which allow a programmer to use a program format which permits easy grasp of the content of a sequence program.

It is still another object of the present invention to provide a sequence control method and apparatus which are suitable to detect a fault location during trouble shooting when trouble has occurred in a sequence control.

According to a feature of the present invention, the stage increment main program and the sequence processing stage programs for each processing stage, which have not been clearly separated, but are mixed in the prior art PC program, are clearly separated, and jump destination address information to the sequence stage programs is not included in the stage increment main program.

DETAILED DESCRIPTION OF THE PREFERRED EMBODIMENTS

Preferred embodiments of the present invention are now explained with reference to the drawings.

Figure 5:
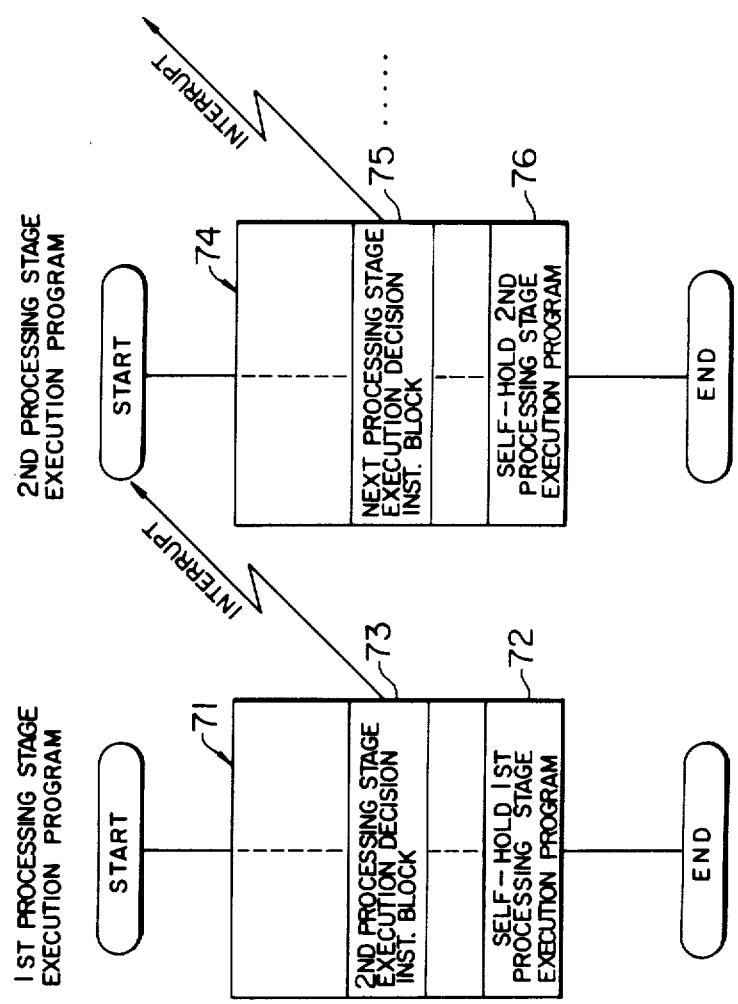
FIG. 5 is a flow chart showing an embodiment of a sequence control method of the present invention.

FIG. 5 shows a first embodiment of the sequence control method of the present invention. In the present embodiment, a sequence program is divided into a plurality of divisional programs of desired processing stage units. As shown in FIG. 5, a first sequence processing stage execution program 71 which includes a plurality of instructions is executed. The sequence processing stage execution program 71 is prepared such that once it is started, it is self-held by a sequence processing stage self-holding instruction 72 so that it is continuously executed. Thus, once the first sequence processing stage execution program 71 is started, the sequence is circulated in the first sequence processing stage execution program 71. When a next sequence processing stage is to be executed, an execution decision instruction block 73 which includes an instruction for deciding whether or not the next sequence processing stage is executed based on information inputted by other instructions from the system under control, and if the decision is made to proceed to the next stage, the sequence control processor issues an interrupt signal and simultaneously the self-hold status of the first sequence processing stage execution program executed by the current sequence processing stage execution instruction 72 is released. In response to the interrupt signal produced by the instruction 73 of the first sequence processing stage execution program 71, a second sequence processing stage execution program 74 is started, and the second sequence processing stage execution program is self-held by an instruction 76, and if a decision in a next stage execution decision instruction block 75 made to is proceed to the next processing stage, an interrupt signal is produced. In the same manner, the sequence is executed.

In the sequence control method of FIG. 5, once a divisional sequence processing stage program is executed, the loop is formed within the sequence processing stage execution program. Accordingly, the sequence cycle time is shortened and the sequence response in each processing stage is fixed. The interrupt signal is used to shift from one sequence processing stage execution program to the next sequence processing stage execution program, and since no jump destination address information is included in the sequence processing stage execution program, the modification such as addition or deletion of the sequence processing stage execution program is facilitated.

Figure 6:
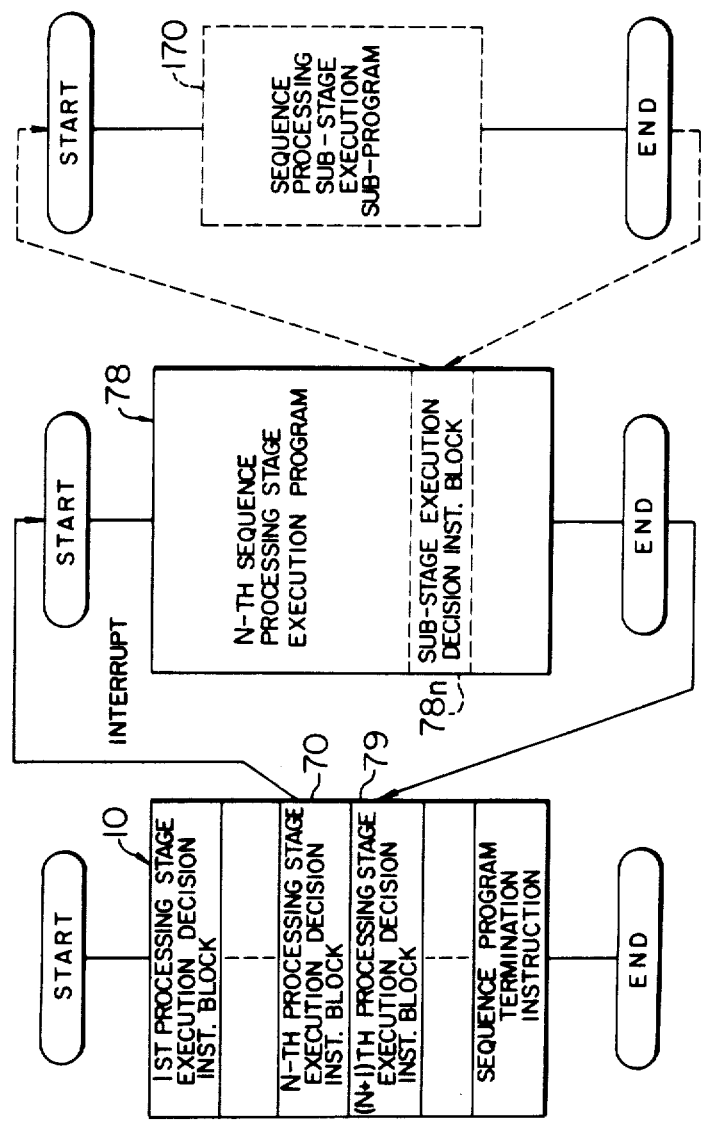
FIG. 6 is a flow chart showing another embodiment of the sequence control method of the present invention.

FIG. 6 shows a second embodiment of the sequence control method of the present invention. In this embodiment, a stage increment main program 10 is cyclically executed by a timer start. Each instruction block of the main program 10 may include an instruction for receiving desired information from the system under control, and an instruction, if a decision is made to execute the corresponding divisional sequence processing stage execution program, for issuing an interrupt signal to execute the sequence processing stage execution program. For example, if the interrupt signal is issued in an n-th processing stage execution decision instruction block 70 of the main program 10, an n-th sequence processing stage execution program 78 is started. At the end of the n-th sequence processing stage execution program 78, the sequence returns to the main program 10 and an (n+1)-th processing stage execution decision instruction block 79 is executed. Similarly, an instruction block 78-n to decide whether one (170) of a plurality of sub-programs including subdivided processing stages is to be executed or not may be provided in the n-th sequence processing stage execution program 78, and if a decision to execute is made in an instruction of the instruction block 78-n, the corresponding sub-program 78-n may be executed.

A manner in which a plurality of sequence processing stage execution programs of the present invention are prepared is now considered.

Figure 7:
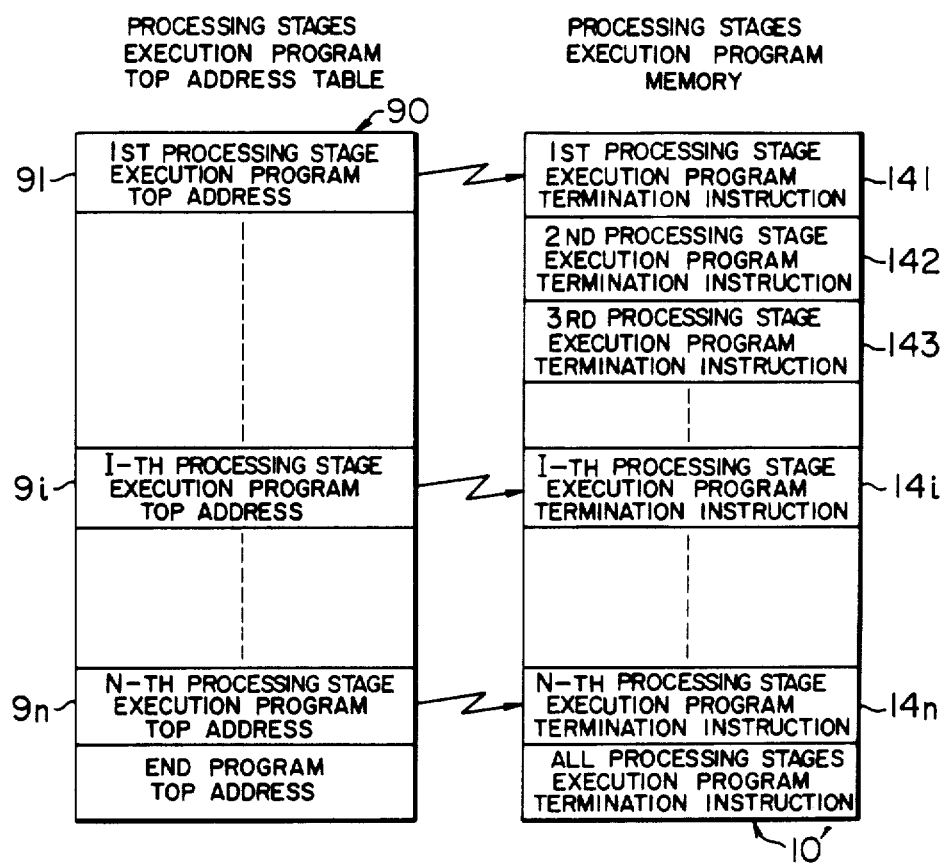
FIG. 7 shows a top address table in an initial condition and a memory area storing a sequence program divided into divisional sequence processing stage programs in the sequence control method of the present invention.

In the present system, sequence processing stage execution program termination instructions 14e, ..., 14N which are slightly larger in number than the number of execution processing stage units of the sequence program are set when the system is initialized. This is illustrated in FIG. 7. Under this condition, no sequence processing stage execution program has been registered. Top addresses of the respective sequence processing stage execution programs are set in a program top address table 90 as addresses 9l–9n.

If a programmer wants to write an I-th sequence processing stage execution program, a start address 9i of the designated sequence processing stage execution program is retrieved from the program top address table 90 and an end instruction address 14i of the designated sequence processing stage execution program is retrieved from a sequence processing stage program memory 10', and a memory space corresponding to a capacity of the new sequence processing stage execution program is formed there and the new sequence processing stage execution program is registered there. The instructions in the memory 10' are shifted backward by the number of words of the new program for the programs subsequent to the I-th program, and the top addresses in the program top address table 90 for the programs subsequent to the I-th program are incremented by the number of words of the new program. Such incrementing is a simple operation and only the top address of the address table 90 is changed in accordance with the change of the address by the registration of the new sequence processing stage execution program.

Figure 8:
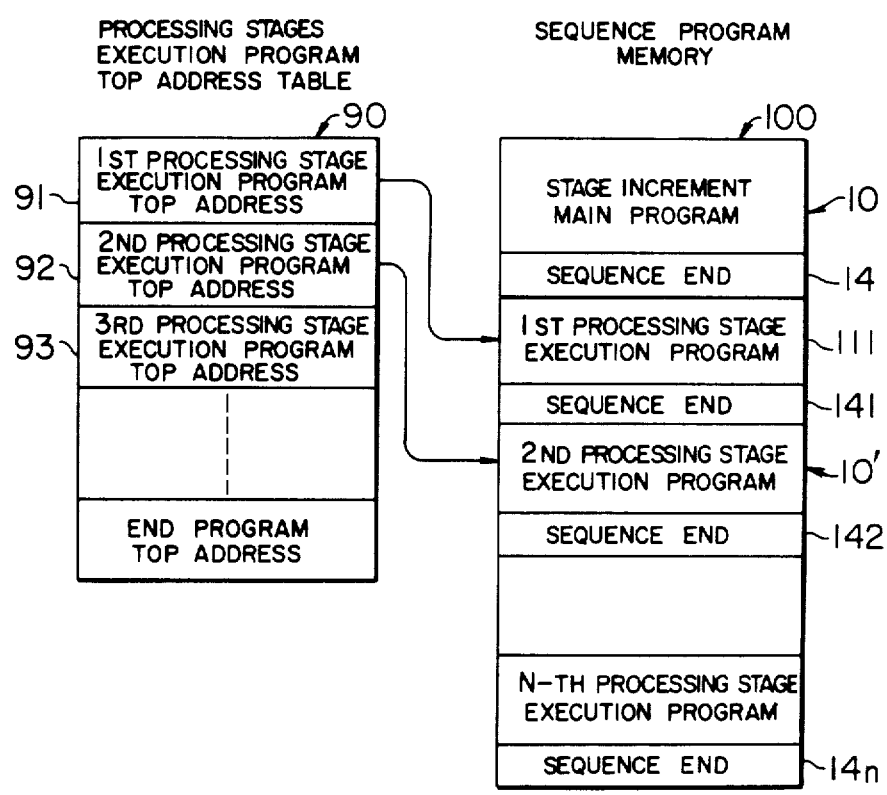
FIG. 8 shows divisional sequence processing stage programs and a main program prepared and registered in a common memory area in the sequence control method of FIG. 6.

The registration of the sequence processing stage execution program is also a very simple operation in the present invention. The programmer first designates the processing stage number of the sequence processing stage execution program to be registered, and then inputs the sequence processing stage execution program (FIG. 8). In the prior art jump instruction system, all jump instructions must be retrieved, checked and corrected. In the present invention, the modifications due to the increase or decrease of the instructions by the correction need be made only to the top address table 90 having the larger program numbers than the corrected one. If the sub-program 170 shown by the broken line in FIG. 6 is included, the correspondence between a plurality of sub-programs and addresses is stored in the address table 90.

The preparation of the stage increment main program 10 which controls the processing stage incrementation of the sequence is now considered. The main program 10 is also prepared by a relay circuit diagram image displayed on a CRT screen. The main program 10 to be registered comprises a plurality of instruction blocks as shown in FIG. 6. In the present embodiment, it is stored at the top of the sequence program stage execution program 10' in the sequence program memory 100 as shown in FIG. 8. When the sub-program 170 as shown in FIG. 6 is included, it is also stored in the sequence program stage execution program 10'.

Figure 9:
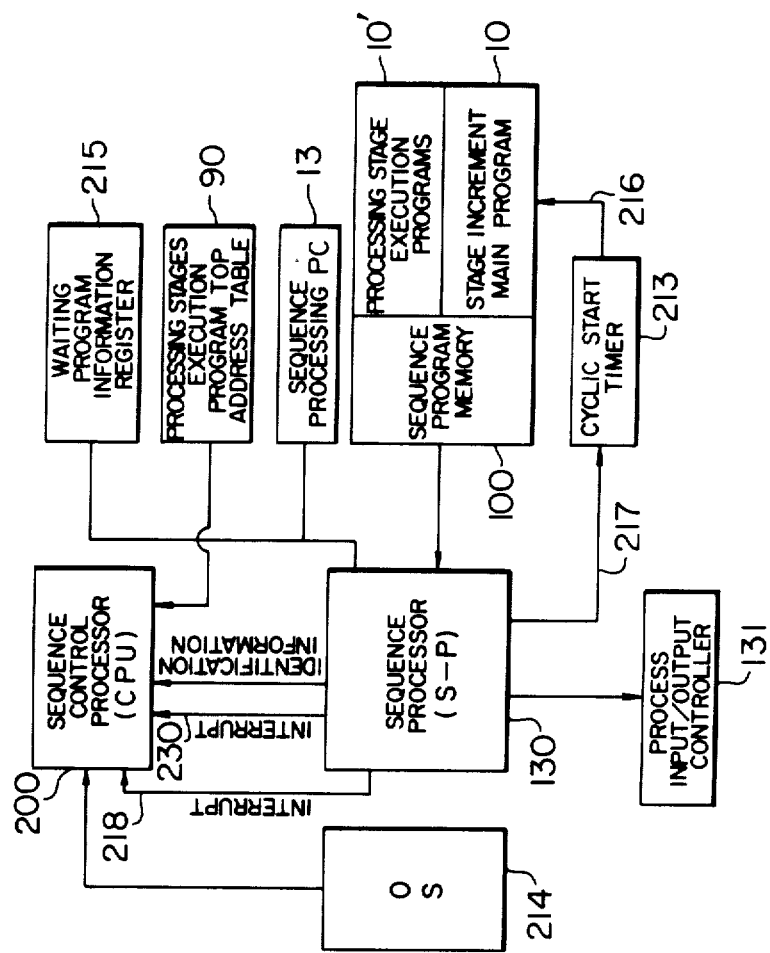
FIG. 9 shows a configuration of a sequence controller for carrying out the sequence control method of FIG. 6 in accordance with the present invention.

The contents of processing and the operations of the respective items have been described. FIG. 9 shows an overall configuration of the sequence control in accordance with an embodiment of the present invention, which uses the functions of those items.

In the present embodiment, the programs stored in a sequence program memory 100 includes divisional programs 10' divided into processing stage units (sequence processing stage execution programs) and the stage increment main program 10 which starts only necessary ones of the sequence processing stage execution programs 10' and controls the overall program. The stage increment main program 10 periodically scans all main program instructions 10 as the conventional PC does in response to a cyclic timer signal 216 generated by a cyclic start timer 213 and determines the sequence processing stage execution program to be started in each instruction block. A cyclic start timer count is preset to the cyclic start timer 213 by a sequence processor (S-P) 130. The S-P 130 is constructed of a digital logic circuit to provide a simple configuration. If a decision result to a sequence processing stage execution decision instruction block in the stage increment main program 10 is true, the content of the program counter is set in a waiting program information register 215 and an interrupt signal 230 is issued from the sequence operation processor 130 to a sequence control processor (CPU) 200 which is constructed of a semiconductor integrated circuit (LSI). As a result, the CPU 200 starts a program OS 214 and determines the sequence processing stage execution program to which the start was requested, based on an identification signal issued together with the interrupt signal, determines a top address of the stored sequence processing stage execution program to be started based on a sequence processing stage execution program top address table 90, sets the content thereof to the program counter 13 of the sequence processor, and starts the sequence operation processor 130 to execute the sequence processing stage execution program.

As the started sequence processing stage execution program is executed and the sequence termination instruction is executed, an interrupt signal 218 is issued from the sequence operation processor 130 to the CPU 200, and the address next to the interruption address of the interrupted stage increment main program 10 is set in the program counter 13 to resume the sequence.

Figure 10:
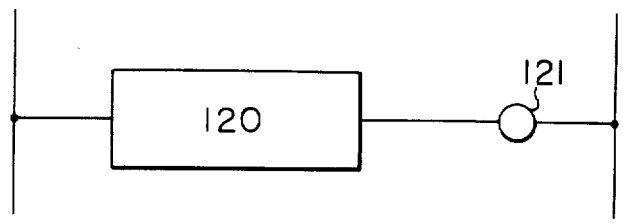
FIG. 10 shows a ladder sequence chart which is an example of the sequence processing program.
Figure 11:
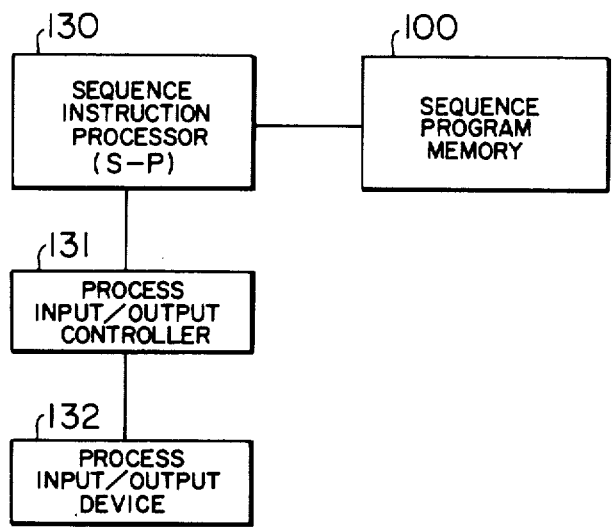
FIG. 11 is a block diagram showing a configuration of a sequence control processor, FIG. 12 show a content of a register of a process input/output controller in FIG. 11.
Figure 12:
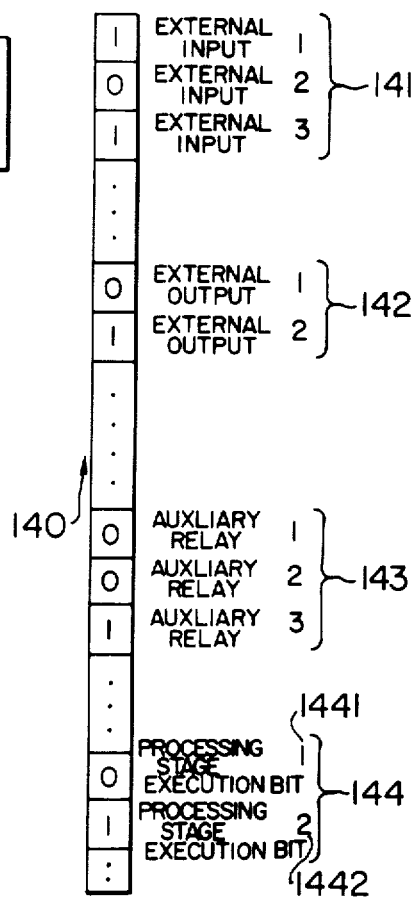

In a relay circuit diagram shown in FIG. 10, a decision condition 120 to start the sequence processing stage execution program of a first processing stage is described by an external input/output contact and a timer, a counter or other internal processing function contact, and a result thereof is represented by a sequence processing stage execution instruction output coil 121 of the first processing stage. In actual practice, a major hardware of the PC is constructed as shown in FIG. 11. The ON/OFF states of all contacts and outputs such as external inputs/outputs, auxiliary relays, latch relays and internal auxiliary functions (including bits of the stage increment instruction) in the process input/output controller 131 are reflected to a sequence instruction input/output buffer memory 140 of FIG. 12, one address per bit. The ON/OFF state of the external input signal and the ON/OFF states of the external output processed by the sequence instruction stored in the sequence program memory 100 by the sequence instruction processor 130 of FIG. 11 are outputted by the process input/output device 131 of FIG. 11 as ON/OFF signals by writing the ON/OFF states to the corresponding address 141 of the external input of the buffer memory 140 and the corresponding address 142 of the external output of the buffer memory 140, respectively. The ON/OFF state of the sequence processing stage execution instruction, that is, the execution status is also stored at the corresponding address 144 or bit of the sequence processing stage execution instruction, of the input/output buffer memory 140, in accordance with the sequence operation result.

For the sake of simplicity of explanation, the sequence step instruction is of a latch type set/reset element image in a relay circuit. (It is not necessarily limited to the latch type but a conventional auxiliary relay contact or coil may be used provided that it is self-held). Once a first sequence processing stage execution set coil is excited, a first stage execution coil or a sequence stage execution (1) 1441 remains in the current state until a first sequence processing stage execution reset coil is excited, and the main program is scanned and each time when the ON state of the first sequence processing stage execution instruction is detected, the CPU 200 is interrupted and the first sequence processing stage execution program top address 91 is set as a program count by the OS 214 by referring to the program top address table 90, and the sequence of the first processing stage is executed. At the end of the sequence of the first stage, the CPU 200 is again interrupted by the sequence termination instruction, and the sequence returns to the stage increment main program by the priority decision of the OS 214 and the sequence is resumed from the next instruction word to the first sequence processing stage execution instruction coil.

In the present system, the number of instruction blocks executed in one scan of the stage increment main program 10 (FIG. 8) is not limited and one or more processing stages may be simultaneously executed as required.

When the execution of the current stage is no longer necessary and the next stage is to be started, the sequence processing stage execution reset instruction coil for the stage to be stopped, in the stage increment main program 10, is excited to stop the scan of that stage, and the sequence processing stage execution set instruction coil for the stage to be started is excited.

An advantage attained in the present system is a short sequence program execution time. In the prior art, all programs including those other than the related stages are scanned. In the present system, only the limited processing stage programs are scanned and hence the sequence cycle time is shortened. Usually, one plant includes 60-120 processing stages. Assuming that three stages are always executed in parallel, the processing time is reduced to 1/20-1/40 (neglecting a scan time of the stage increment main program 10). Taking the overhead of the OS and the execution time of the stage increment main program, the processing time is reduced to 1/10-1/20. As a result, the sequence cycle is shortened, and a positioning stage which could not be executed in the prior art PC and executed by a hardware incorporating a microprocessor or a counter as an optional function, can be executed by the PC.

As a second advantage, the stage increment program and the program for each stage are completely separated and hence the sequence program can be divided in a manner that a programmer wants. For example, it is said that approximately 60% of a machine tool control program can be repeatedly used. In this case, the functions of the present invention can be registered, edited and operated not only as the program for each processing stage but also as a standard sequence program package. Thus the number of work steps in the design work and the application in the field can be reduced to ⅓-⅔.

The execution of the sequence stage reset instruction is described. In the stage increment execution, when the sequence is to be moved from one stage to the next stage, it is frequently desirable to reset all control outputs in the current stage. In the present invention, when the sequence processing stage execution reset instruction is issued, not only the contact signal of the corresponding sequence processing stage execution instruction is turned off but also the program of that stage is scanned again without applying a voltage to a common line in a relay ladder chart image. (In a normal operation, a signal is turned on by a + common line, that is, "1" is set to an accumulator (ACC). For the sequence processing stage execution reset instruction, however, "0" is set to the ACC so that all outputs related to that stage can be turned off.)

Figure 13:
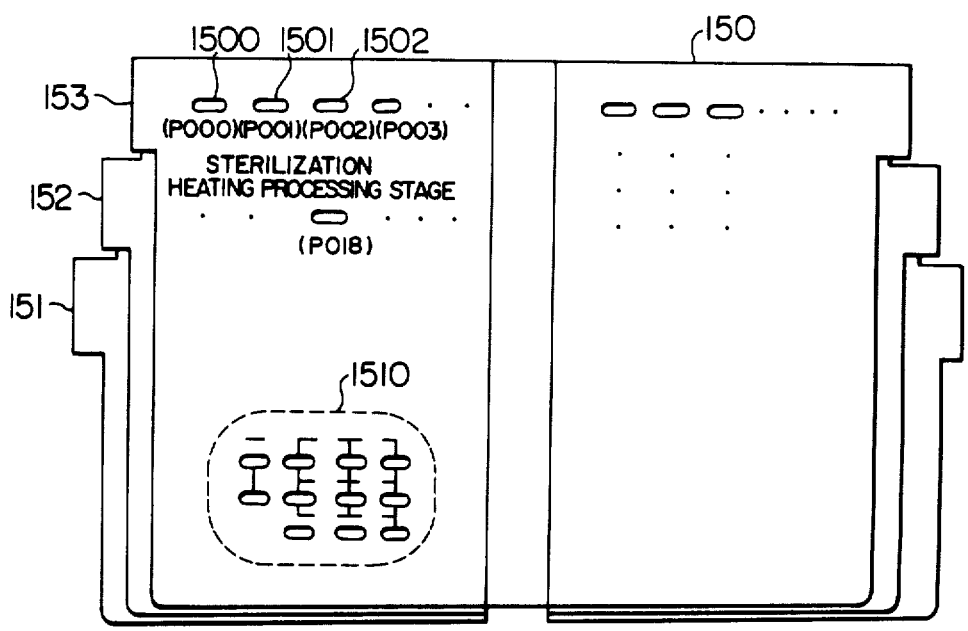
FIG. 13 shows an embodiment of a program input keyboard of the sequence controller of the present invention.

Usually, the sequence logic is designed in the form of a stage increment block diagram. In the present invention, the sequence program can be designed in the same manner as the prior art design in a page. FIG. 13 shows a key entry unit 150 of a programming device. The keyboard 150 has a number of input keys 1500, 1501, - - - so that 160 items can be entered. By turning a page (151, 152, 153 - - - ), another set of 160 items can be selected. Twenty-four pages ae provided.

What first comes up in the mind of a designer are a stage increment diagram and names of the processing stages. They are not function symbols or processing stage numbers. Thus, the designer assigns an item name to each sequence processing stage execution instruction. In the illustrated example, "P" of the sequence processing stage execution instruction represents a function, and the following three digits represent a processing stage number. For example, for "P018", a processing stage 18 is executed if the output coil of the stage No. 18 is ON, and the execution of the processing stage 18 is interrupted when a reset coil of "P018" is excited. If a mode to turn off all outputs of the program related to the processing stage 18 when the stage 18 is reset is designated, all outputs can be turned off in a first run after the excitation of the reset output coil.

The name "P018" has a close connection to the hardware of the PC and may be convenient to use, but from standpoint of the designer, it is an insignificant code and it is not associated with the processing stage name representing the content of the process. In the present invention, the programming device handles the function symbol "P" and the three digits "018" but the designer assigns easily understandable names using alphanumerics, KANA characters or KANJI characters, to the sequence processing stage execution instructions P000, P001, - - - which have the serial numbers, by opening an appropriate page (151, 152, - - - ) of the keyboard 150. For example, "P018" is defined as "Sterilization Heating Process". For the designer, the name "P018" means the "Sterilization Heating Process" and he/she needs only recognize this processing stage name in designing the sequence. Specifically, the processing stage execution instructions are assigned to the serial numbers starting from "P000" as shown in FIG. 13. The numbers shown in "( )" in FIG. 13 are not marked on the page sheets (151, 152, - - - ) of the keyboard 150 and the designer marks the processing stage name of "Sterilization Heating Process" on the keys (1500, 1501, - - - ) of the keyboard 150 by a pencil or other writing tool. The name marked on the keyboard 150 must correspond to the processing stage name assigned to the sequence processing stage execution instruction.

Figure 14A:
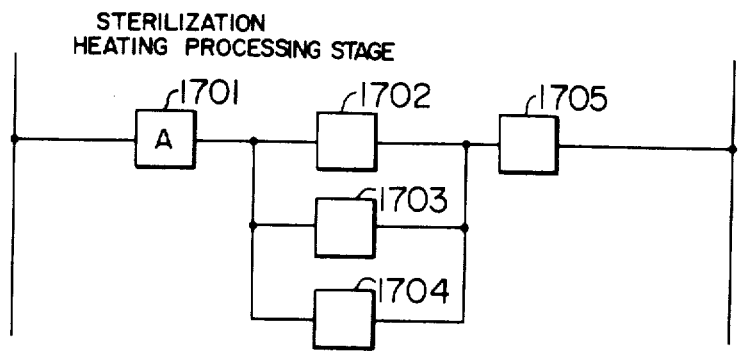
FIGS. 14a, 14b and 14c show a step block diagram and a ladder sequence chart for monitoring the execution of the sequence processing stages.

The flow of the stage increment main program is drawn by the processing stage names. As shown in FIG. 14a, a stage increment flow chart is prepared on a CRT viewer 170 by operating the keyboard 150. For example, the keyboard 150 includes a branch key 1510 which designates a contact state between blocks. In the block diagram of FIG. 14a, a block A 1701 is executed as a first processing, and after the block A 1701 has been executed, processings B, C and D 1702, 1703 and 1704 are parallelly executed as separate processings. When all of those processings have been executed, a processing E 1705 is executed.

Figure 14B:
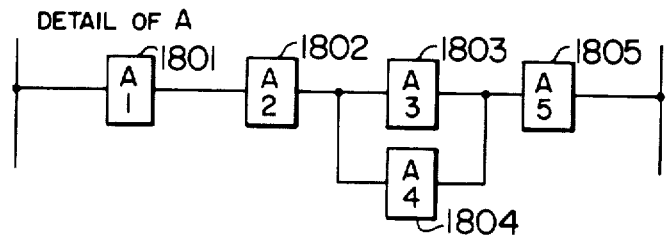
Figure 14C:
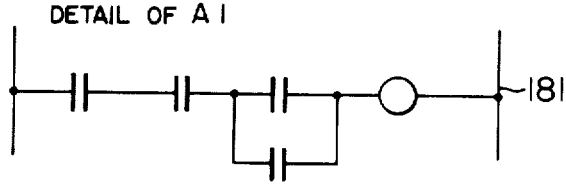

As shown in FIG. 14b, a detail of the processing block A 1701 can be hirerachically shown as a detailed processing block diagram. Finally, the sequence control program for the respective processings is expressed by a well-known relay ladder image sequence program 181 as shown in FIG. 14c. A feature of the present invention resides in that the sequence programs can be separately and independently described for each processing. Accordingly, the designer need not take care of other processings and can program the sequence relay ladder chart image as a single closed program. Since the sequence program of the present invention is constructed by the stage increment main program, the processing stage execution programs divided from the sequence program, and the sub-divided stage execution sub-programs as required, it well matches process of thinking of the program designer.

Figure 15:
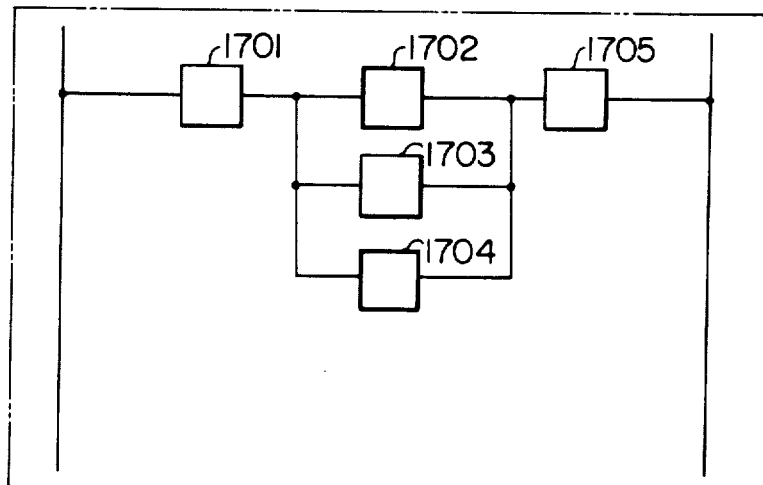
FIG. 15 shows a time chart of sequence processing stages execution status displayed on a CRT screen.

A method for monitoring the operation when the facilities are to be controlled by the sequence program is now described. As a method for monitoring the operation of the sequence control by the PC, it is common to display the relay ladder circuit diagram on the CRT screen by designating the name of the output coil and display the ON/OFF states of the contacts and the outputs in the circuit by thick lines or thin lines. In the present invention, it is further developed. That is, the stage increment flow block diagram is displayed on the CRT screen, and only the blocks of the stage currently executed are shown by the thick lines to facilitate a clear understand of the operation status. In the sequence logic operation, the processing stage currently executed can be displayed by checking the ON/OFF state of the sequence instruction buffer memory (FIG. 12) which controls the ON/OFF states of the contacts of the sequence stage execution instructions (P000, - - - ). An example of the display is shown in FIG. 15. It is seen that processings 1702, 1703 and 1704 have been started in parallel and the processing 1703 has been executed but the processings 1702 and 1704 are being executed.

In the present invention, the ON/OFF states of the sequence processing stage execution instruction is intermittently checked and displayed on the CRT screen in the form of a time chart. The sampling interval may be arbitrarily set by the operation. By designating the items to be monitored by the keyboard 150 used to enter the processing stage name, the designated processing stage names are displayed and the in-process state or the interrupt state of the stage is displayed by a white line or blanking on the CRT character display at the predetermined sampling interval. As the time chart display starts from the left end and reaches the right end, the screen is scrolled to the left one character position for each sampling time.

For a periodically and cyclically operating object under control, the time chart being displayed is cleared in response to a cycle end signal, and when a cycle start signal is received, the time chart is again displayed starting from the left end.

The processing for fault diagnostic in accordance with the present invention is now described. In the sequence interlock control, if a fault or an error occurs in the equipment under control, the sequence control is stopped in most cases because a condition for the processing increment from the current processing to the next processing is not met. Accordingly, each processing has a processing delay check timer having a set time which is slightly longer than a normal processing execution time. If the fault occurs, the processing delay check timer is actuated to allow the check of the processing at which the fault occurred. The fault processing may be determined by using this processing delay check timer, but, in the present invention, when a timeout error occurs, the processing stage in which the contact state of the sequence processing stage execution instruction, which is a work area of the sequence operation, is on, the processing stage which is still under execution is checked. The name of that processing stage is displayed and the sequence relay ladder chart of the stage increment output name of that stage, that is, the stage increment condition of the processing 1704, is retrieved from the stage increment main program and displayed on the CRT display, and the ON/OFF states of the contacts of the relay ladder and the range of alive + common line in the relay ladder chart are also displayed on the CRT display so that a particular processing stage and a particular processing stage increment condition which caused the delay in the stage and a particular part of the control circuit which caused the delay can be identified.

While the program started by the stage increment main program represents the sequence processing stage execution program, it may be a computer mode program for handling analog data if the sequence operation processor 130 is a computer sequencer which can handle both a sequence mode instruction and a computer mode instruction. In this case, the CPU 200 may be omitted.

Figure 16:
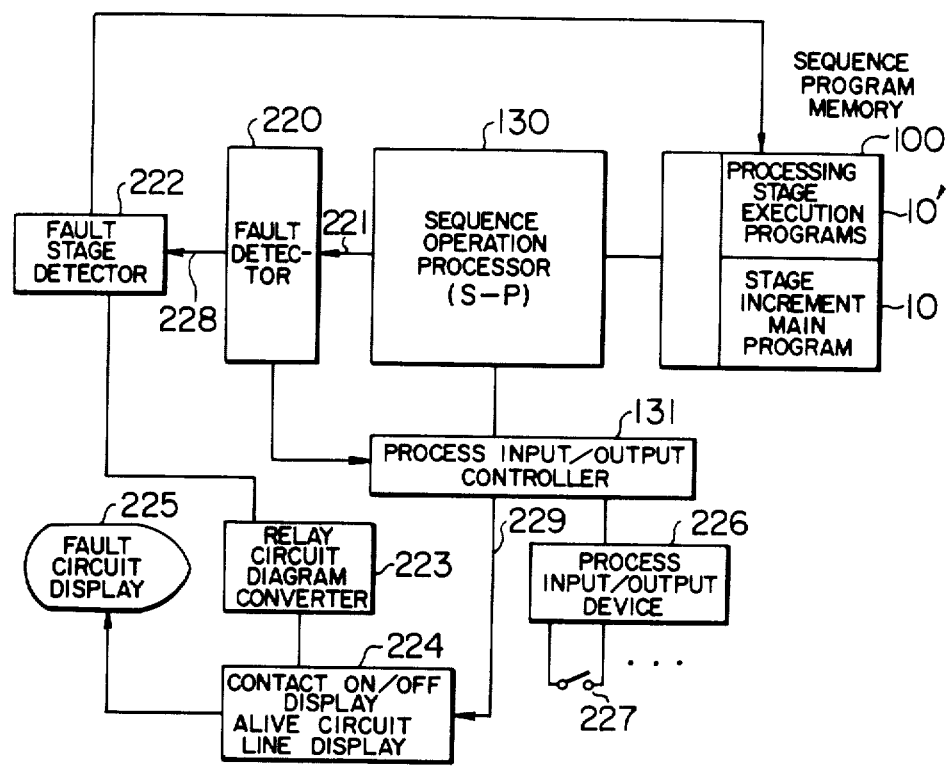
FIG. 16 shows another embodiment of the sequence controller which carries out the sequence control method in accordance with the present invention.

FIG. 16 shows an embodiment which adds a fault diagnostic function to the present apparatus. In FIG. 16, like numerals to those in FIG. 9 designate like functions. FIG. 16 shows only a major portion of the sequence controller.

Let us assume that the field equipment 227 fails and does not produce a signal while the sequence operation processor 130 executes the sequence program stored in the program memory 100. A "0" signal, in this case, is written into a sequence instruction input/output buffer memory 131 through a process input/output device 226, in accordance with the ON/OFF state of the field equipment 227. Since this signal is not read out, the processing delay check timer contained in the program memory 100 is timed out and a time-out signal is sent to a fault detector 220 from the sequence operation processor 130. The fault detector 220 detects the sequence processing stage which is not turned off after the time-out because of the stop of the execution, from the sequence processing stage execution signal 144 stored in the sequence instruction input/output buffer memory 131, and indicates the fault processing stage number 228 to a fault stage increment detector 222. The fault stage increment detector 222 retrieves instructions for one circuit of the sequence logic circuit block which relates to the sequence processing stage execution reset output instruction which prevents the shift to the next processing stage because of the processing stage delay, from the stage increment main program, and sends those instructions to a relay circuit diagram converter 223, which converts the instructions to a relay circuit diagram. ON/OFF signals 229 for all contacts and outputs in the circuit are read into a block 224 which edits the ON/OFF states of the contacts and the outputs and the alive circuit lines and sends them to the CRT display so that the ON/OFF states of the signals and the alive circuit lines are displayed on the CRT screen 225, which also displays the wirings and the circuit components by thick lines and thin lines.

Since it displays a transition condition to the next processing stage relating to the fault area, a particular transition condition which causes the processing delay can be instantly determined.

I claim:

1. A sequence control apparatus comprising:
   means for storing a plurality of divisional programs divided from a sequence program for sequence-controlling a system under control, each of said divisional programs corresponding to a respective one of a plurality of processing stage units of a sequence process for the system;
   means for storing a main program including a plurality of instruction blocks, each instruction block corresponding to a respective one of the divisional programs and including a decision step of whether the corresponding divisional program is to be executed or not in accordance with information read from the system under control;
   an address table containing information indicating the correspondence between said divisional program and their top addresses;
   a first processor connected to said main program storing means and including a program counter for cyclically executing said main program while updating the content of the program counter and reading out the information from the system under control, and for interrupting the execution of said main program to produce a control signal including identification information for identifying the divisional program corresponding to the instruction block being executed when it is determined during the execution of the corresponding instruction block that said divisional program is to be executed; and
   a second processor connected to said address table and said first processor and responsive to said control signal for retrieving from said address table the top address of the divisional program for the instruction block in which said control signal was produced, based on the identification information of said control signal, and for setting the retrieved top address into said program counter of said first processor.

2. A sequence control apparatus according to claim 1 wherein said means for storing the divisional programs and said means for storing the main program are contained in a memory area of said first processor, and said address table is contained in a memory area of said second processor.

3. A sequence control apparatus according to claim 1 wherein the control signal is an interrupt signal generated by said first processor to said second processor.

4. A sequence control apparatus according to claim 1 further comprising a register for indicating execution status of said divisional programs.

5. A process control apparatus according to claim 1 further comprising means for storing a plurality of sub-programs sub-divided from said divisional programs, said address table further containing information indicating correspondence between said sub-programs and top addresses, at least one of said divisional programs determining whether the selected sub-program is to be executed or not, said first processor including means for producing an interrupt signal including identification information for identifying the sub-program to be executed.

6. A sequence control method for a programmable controller, comprising:
   preparing a sequence program by the steps of
   (a) dividing a sequence program for a system under control so as to provide a plurality of divisional programs, each of said divisional programs corresponding to a respective one of a plurality of processing stage units of a sequence process for the system, and storing the divisional programs in a memory;
   (b) constructing and storing a main program including a plurality of instruction blocks, each instruction block corresponding to a respective one of the divisional programs and including a decision step of whether each of the divisional programs is to be executed or not in accordance with information read from the system under control; and
   executing the prepared sequence program by the steps of
   (c) reading information from the system under control;
   (d) executing said main program by means of a processor repeatedly to determine whether or not each of said divisional programs is to be executed on the basis of the information read from the system under control, and producing a control signal including identification information for identifying a divisional program to be executed, when said processor determines that said divisional program is to be executed, in the course of execution of the instruction block corresponding to said divisional program; and
   (e) interrupting the execution of the main program in response to the control signal, executing the divisional program corresponding to the instruction block in which said control signal was produced, and resuming the execution of the main program after the execution of the divisional program.

7. A sequence control method according to claim 6 further including a step of preparing an address table indicating a correspondence between said divisional programs and their top addresses to be used for the execution of the divisional programs.

8. A sequence control method comprising:
   (a) dividing a sequence program for a system under control so as to provide a plurality of divisional programs, each of said divisional programs corresponding to a respective one of a plurality of processing stage units of a sequence process for the system, and storing the divisional programs in a memory;
   (b) constructing and storing a main program including a plurality of instruction blocks, each instruction block corresponding to a respective one of the divisional programs and including a decision step of whether each of the divisional programs is to be executed or not in accordance with information read from the system under control;

(c) reading information from the system under control;

(d) executing said main program by means of a processor repeatedly to determine whether or not each of said divisional programs is to be executed on the basis of the information read from the system under control, and producing a control signal including identification information for identifying a divisional program to be executed, when said processor determines that said divisional program is to be executed, in the course of execution of the instruction block corresponding to said divisional program; and (e) interrupting the execution of the main program in response to the control signal, executing the divisional program corresponding to the instruction block in which said control signal was produced, and resuming the execution of the main program after the execution of the divisional program;

further including a step of preparing an address table indicating a correspondence between said divisional programs and their top addresses to be used for the execution of the divisional programs;

wherein a second processor other than said main program execution processor is provided, and in said step (e) said second processor responds to said control signal to search said address table based on the identification information of said control signal, reads out the top address of the divisional program for the instruction block of the main program in which said control signal was produced, and causes said main program execution processor to execute the divisional program starting from said top address.

9. A sequence control method according to claim 8 wherein said control signal is an interrupt signal to said second processor.

10. A sequence control method according to claim 9 further comprising a step for preparing and storing a plurality of sub-programs sub-divided from said divisional programs, wherein in said step (d), if a sub-program is to be executed during the execution of the divisional program, and interrupt signal including identification information for identifying said sub-program is produced.

11. A sequence control method comprising:

(a) dividing a sequence program for a system under control so as to provide a plurality of divisional programs, eacc of said divisional programs corresponding to a respective one of a plurality of processing stage units of a sequence process for the system, and storing the divisional programs in a memory;

(b) constructing and storing a main program including a plurality of instruction blocks, each instruction block corresponding to a respective one of the divisional programs and including a decision step of whether each of the divisional programs is to be executed or not in accordance with information read from the system under control;

(c) reading information from the system under control;

(d) executing said main program by means of a processor repeatedly to determine whether or not each of said divisional programs is to be executed on the basis of the information read from the system under control, and producing a control signal including identification information for identifying a divisional program to be executed, when said processor determines that said divisional program is to be executed, in the course of execution of the instruction block corresponding to said divisional program; and (e) interrupting the execution of the main program in response to the control signal, executing the divisional program corresponding to the instruction block in which said control signal was produced, and resuming the execution of the main program after the execution of the divisional program;

wherein said step (e) includes a step of storing execution status of said divisional programs in a register.

12. A sequence control method according to claim 11 further comprising the steps of starting a timer at a start of the execution of a selected instruction block of said main program; reading out the execution status of the divided programs stored in said register in response to a time-out of said timer and detecting the divisional programs which are being executed at the time of the time-out; and displaying the divisional programs under the execution on a display as fault information.

13. A sequence control method according to claim 12 wherein a setting time of said timer is longer than a normal execution time of the divisional program for the instruction block of said main program in which said timer was started.

14. A sequence control method for a programmable controller, comprising:

preparing a sequence program by the steps of (a) dividing a sequence program for a system under control, so as to provide a plurality of divisional programs, each of said divisional programs corresponding to a respective one of a plurality of processing stage units of a sequence process for the system, and storing the divisional programs in a memory; and executing the prepared sequence program by the steps of (b) executing one divisional program by means of a processor;

(c) self-holding the execution of said one divisional program so as to execute said one divisional program repeatedly;

(d) determining whether or not a next divisional program is to be executed during the execution of said one divisional program;

(e) producing an interrupt signal when it is determined that the next divisional program is to be executed; and (f) executing the next divisional program and releasing the self-holding of the execution of said one divisional program in response to said one interrupt signal.

* * * * *